US005506071A

United States Patent [19]

Tanaka et al.

[11] Patent Number: 5,506,071

[45] Date of Patent: Apr. 9, 1996

[54] SEALING ELECTRODE AND SURGE ABSORBER USING THE SAME

[75] Inventors: Yoshiyuki Tanaka; Takaaki Itoh; Masatoshi Abe, all of Saitama, Japan

[73] Assignee: Mitsubishi Materials Corporation, Tokyo, Japan

[21] Appl. No.: 140,028

[22] PCT Filed: Feb. 25, 1993

[86] PCT No.: PCT/JP93/00234

§ 371 Date: Oct. 27, 1993

§ 102(e) Date: Oct. 27, 1993

[87] PCT Pub. No.: WO93/17475

PCT Pub. Date: Sep. 2, 1993

[30] Foreign Application Priority Data

| | | | |
|---|---|---|---|
| Feb. 27, 1992 | [JP] | Japan | 4-076356 |
| Feb. 27, 1992 | [JP] | Japan | 4-076357 |
| Aug. 21, 1992 | [JP] | Japan | 4-245705 |
| Aug. 21, 1992 | [JP] | Japan | 4-245706 |

[51] Int. Cl.[6] ........ H01M 2/34

[52] U.S. Cl. ........ 429/181; 361/118

[58] Field of Search ........ 428/629, 676; 429/181; 361/118, 120

[56] References Cited

U.S. PATENT DOCUMENTS

| | | | |
|---|---|---|---|
| 1,889,105 | 11/1932 | Parker | 428/629 |
| 1,949,623 | 3/1934 | Quarnstrom | 428/676 |
| 2,081,051 | 5/1937 | Friederich . | |
| 2,700,126 | 1/1955 | Jänner | 428/629 X |
| 3,431,452 | 3/1969 | Hale et al. . | |
| 4,608,320 | 8/1986 | Mochizuki et al. | 428/629 |
| 4,729,053 | 3/1988 | Maier et al. . | |

FOREIGN PATENT DOCUMENTS

| | | |
|---|---|---|
| 3-77293 | 4/1991 | Japan . |
| 4-10373 | 1/1992 | Japan . |
| 4-65087 | 3/1992 | Japan . |

OTHER PUBLICATIONS

Cotton and Wilkinson, *Advanced Inorganic Chemistry* New York et al., Wiley and Sons, 1966, pp. 894–895.

*Primary Examiner*—Stephen Kalafut
*Attorney, Agent, or Firm*—McAulay Fisher Nissen Goldberg & Kiel

[57] ABSTRACT

A surge absorber 20 is produced by sealing a glass tube 10 by sealing electrodes 11 and 12 in state that the glass tube 10 is incorporated with a surge absorbing element 13 and with inert gas 14. The sealing electrode is constructed of an electrode member 11*a* made of alloy containing iron and nickel, and a copper thin film 11*b* or 21*b* of a predetermined thickness formed on both surfaces of this electrode member or only on one-side surface in contact with the glass tube and facing on an inside of the glass tube. A $Cu_2O$ film 11*c* may preferably be formed on a surface of the copper thin film. This sealing electrode can be sealed in an inert gas atmosphere and has a satisfactory sealability to the glass tube with an electron emission accelerating action. In case where the copper thin film is formed on both surfaces of the electrode member, a lead wire can easily be soldered on an outer surface of the sealing electrode. The surge absorber sealed by this sealing electrode, at the time of sealing and arc discharging, is hardly deteriorated of its conductive coating and micro-gap, and has a higher surge resistance with a long service life.

15 Claims, 7 Drawing Sheets

FIG. 1a
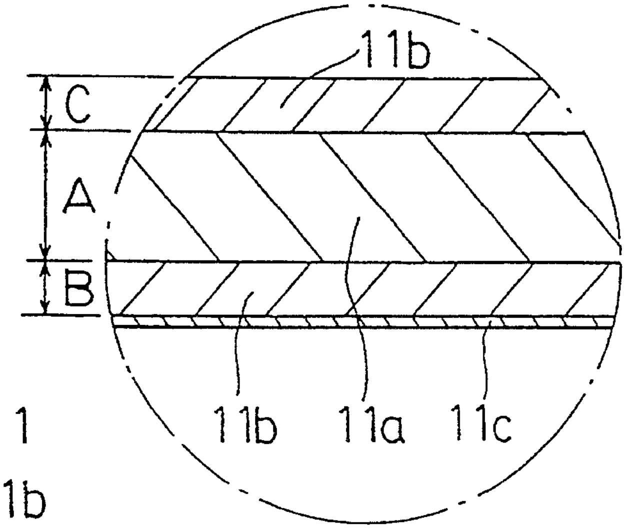
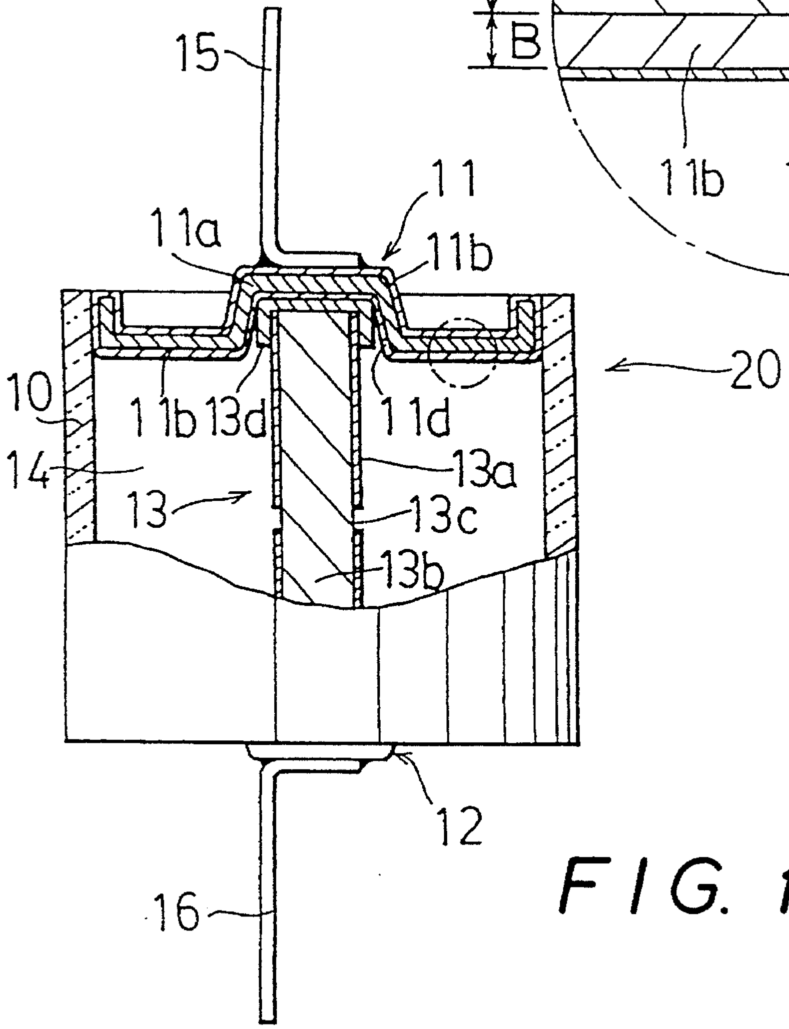
FIG. 1b

FIG. 4a
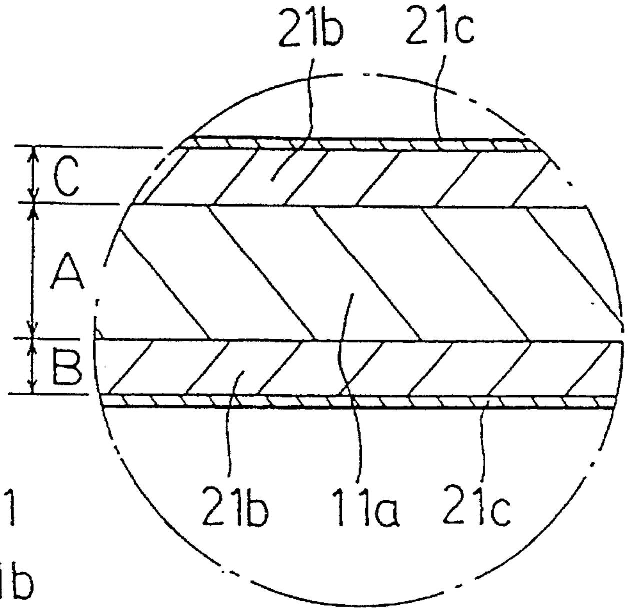
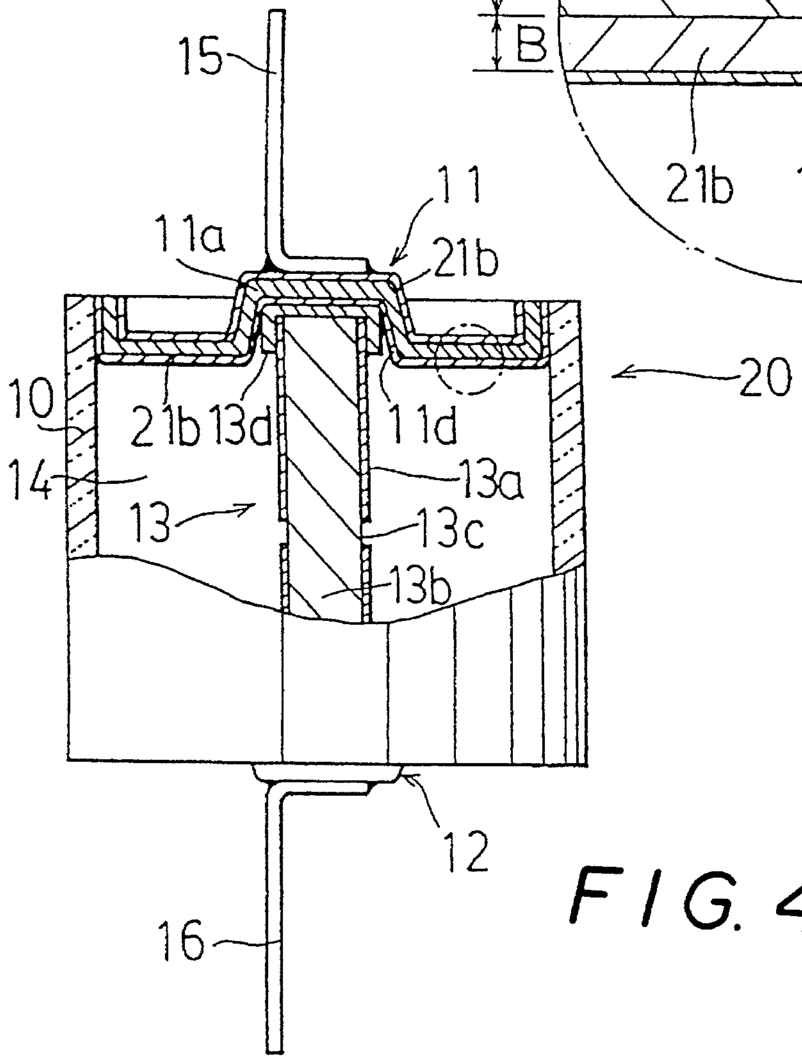
FIG. 4b

FIG. 6a
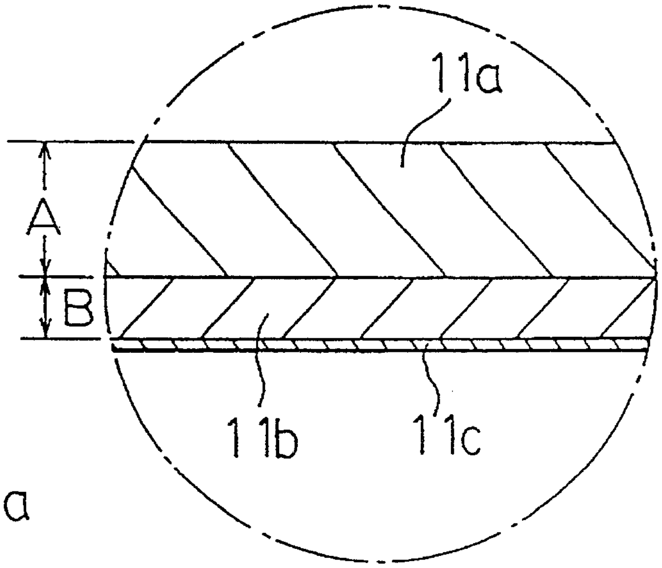
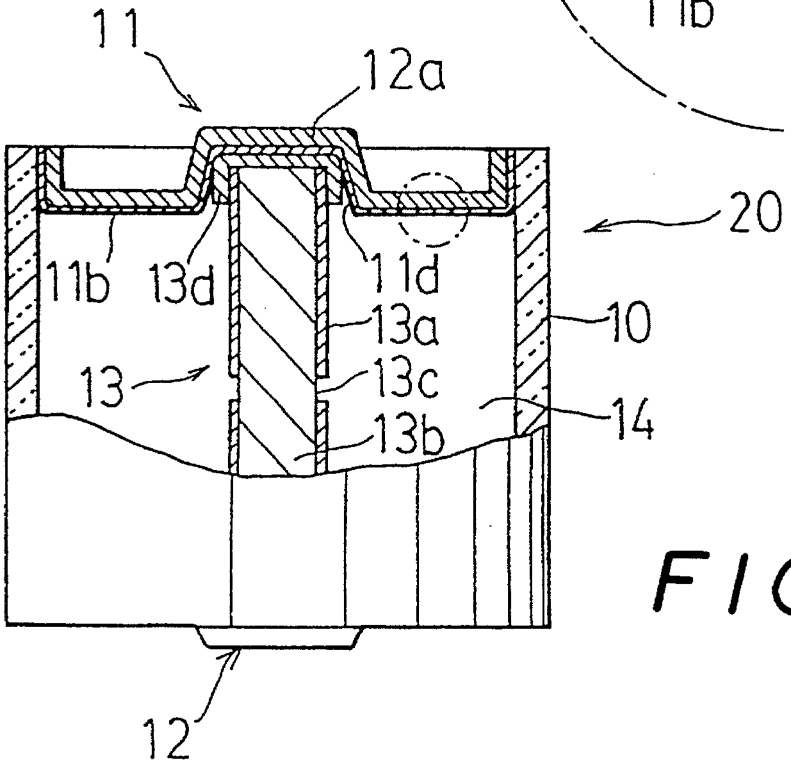
FIG. 6b

FIG. 9a
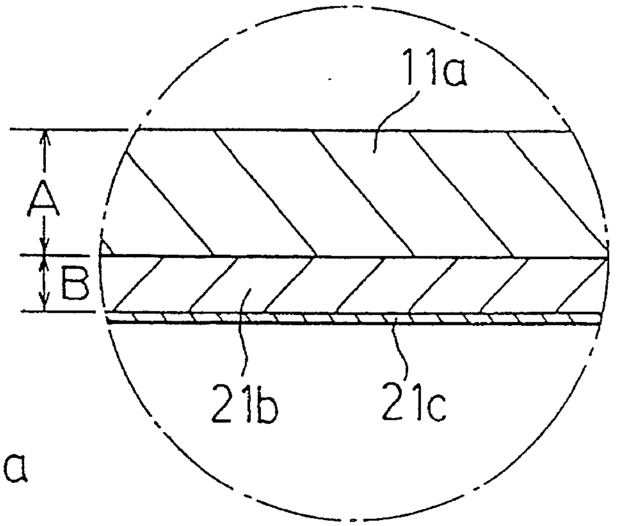
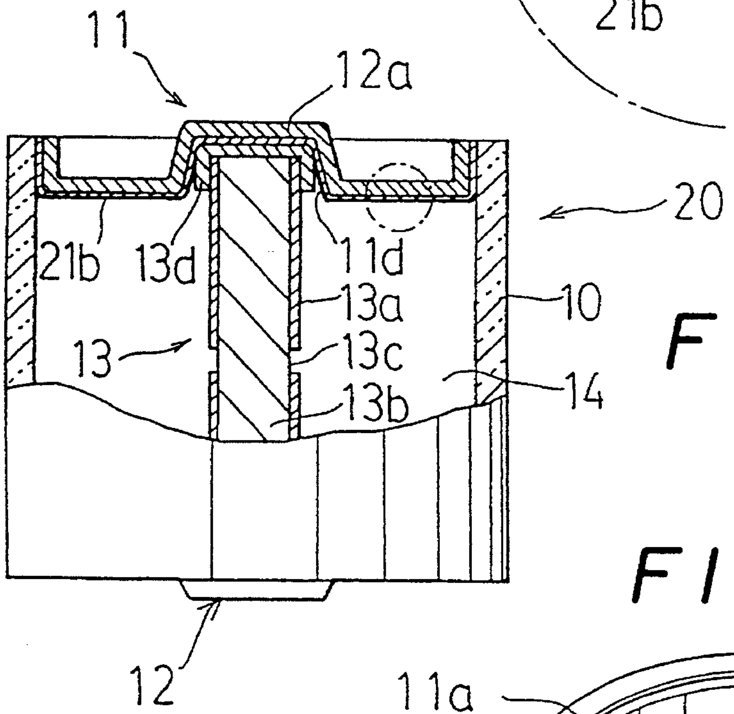
FIG. 9b
FIG. 10
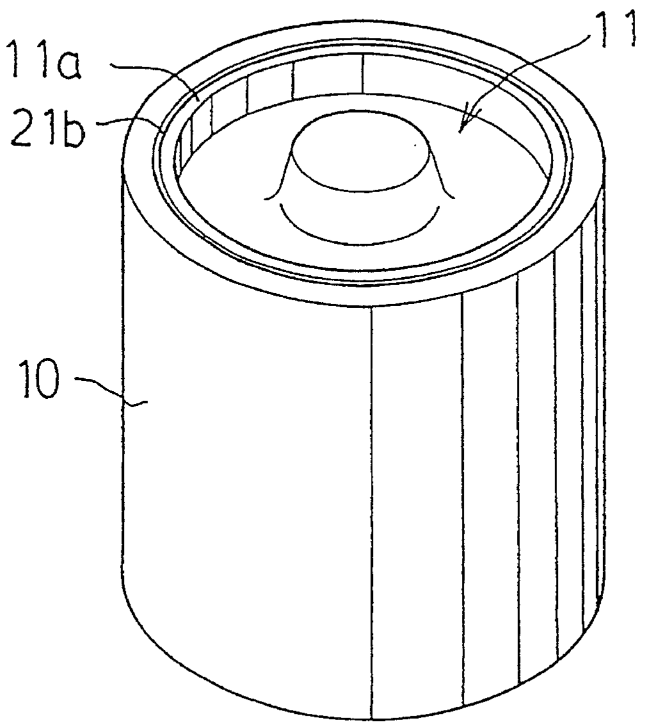

SEALING ELECTRODE AND SURGE ABSORBER USING THE SAME

This application is a national phase application of PCT application no. PCT/JP93/00234, published as WO 93/17475.

TECHNICAL FIELD

The present invention relates to a sealing electrode sealed in a glass tube and a surge absorber using the same. In more detail, it relates to a surge absorber in which a micro-gap type surge absorbing element is hermetic sealed within a glass tube.

BACKGROUND OF ART

The surge absorber of this kind is used for protecting, from lightning surge, electronics parts of communication equipment such as telephone sets, facsimiles, telephone exchanger plants, and modems and the like. This surge absorber is made by process that a sealing electrode is attached on both ends of a glass tube incorporating a micro-gap type surge absorbing element, the glass tube is sealed therein with inert gas such as rare gas, nitrogen gas and the like, and thereafter the glass tube, which has been heated to a high temperature by a heater such as a carbon heater, is sealed with the sealing electrode.

Generally, the sealing electrode uses metal as its member having a thermal expansion coefficient equal to that of glass in order to prevent occurrence of cracks due to thermal contraction of the glass tube at the time of sealing, and upgrades a wettability for glass at the time of sealing, thus an oxide film is provided on a surface of the, member which is a portion in contact with the glass tube. Heating the sealing electrode at a high temperature provides adhesiveness of the metal through the oxide film to the glass and the glass tube is sealed with the sealing electrode to produce air tight therein.

Conventionally, iron-nickel-chromium alloy and Dumet wire and the like have often been used for the member of the sealing electrode for soft glass. For example, Unexamined Published Japanese Patent Application No. 55-128283 discloses a surge absorber using Dumet wire as an member of a sealing electrode for sealing both ends of a soft glass tube incorporating a micro-gap type surge absorbing element. In addition, covar and iron-nickel alloy are used for hard glass or ceramics.

On the other hand, the surge absorber, in which the conventional micro-gap type surge absorbing element is incorporated in air tight in the glass tube, has no accelerating action of electron emission in the sealing electrode, accordingly an arc discharge at the time of operation passes over a conductive coating and a micro-gap on the surface of the ceramics member, but thereafter hardly reaches the sealing electrode. For this reason, a long time is required for forming an arc discharge in vicinity of the micro-gap, the conductive coating and the micro-gap are deteriorated because of the arc discharge, this then provides an adverse effect to a service life characteristic or a characteristic such as a surge resistance and the like of the surge absorber.

An object of the present invention is to provide a sealing electrode capable of sealing at a relatively lower temperature in an atmosphere of inert gas and having an electron emission accelerating action in addition to a satisfactory adhesiveness to the glass tube.

Another object of the present invention is to provide a sealing electrode capable of easily soldering lead wire.

A still another object of the present invention is to provide a surge absorber having a long service-life with a higher surge resistance capable of hardly deteriorating a conductive coating and a micro-gap at the time of sealing and arc discharging.

DISCLOSURE OF THE INVENTION

To achieve the objects described above, a first sealing electrode sealed to a glass tube of the present invention, as shown in FIG. 1 or 4, includes an electrode member 11*a* formed of alloy containing iron and nickel, and a copper thin film 11*b* or 21*b* of a predetermined thickness formed on both surfaces of the electrode member 11*a*.

A second sealing electrode sealed to the glass tube of the present invention, as shown in FIG. 6 or 9, includes an electrode member 11*a* formed of alloy containing iron and nickel, and a copper thin film 11*b* or 21*b* of a predetermined thickness provided respectively on both a surface of an member 11*a* of a contact portion with a glass tube 10 and a surface of an member 11*a* facing on an inside of the glass tube 10.

A surge absorber of the present invention, as shown in FIG. 1, comprises a glass tube 10; a surge absorbing element 13 incorporated in the glass tube 10 and having a pair of cap electrodes 13*d* on both ends of a ceramics member 13*b* wherein a micro-gap 13*c* is formed on a periphery surface of the ceramics member 13*b* of a pillar shape coated by a conductive coating 13*a;* sealing electrodes 11, 12 each of which fixes the surge absorbing element 13 in a manner of being sealed on both ends of the glass tube 10 and is electrically connected to the one pair of cap electrodes 13*d;* and inert gas 14 sealed into space formed by the sealing electrodes 11, 12 and the glass tube 10.

The glass tube of the present invention is made of hard glass such as borosilicate glass or soft glass such as lead glass and soda glass. It is possible to apply the soft glass having a larger thermal expansion coefficient than the hard glass. The electrode member is formed of alloys containing iron and nickel such as iron-nickel alloy, iron-nickel-chromium alloy, and iron-nickel-cobalt alloy and the like in which their thermal expansion coefficients are lower than glass. The electrode member is formed by molding into a predetermined shape. To match the thermal expansion coefficient of the electrode member with the thermal expansion coefficient of the glass tube, the electrode member is coated with the copper thin film having a larger thermal expansion coefficient. That is, when a difference between the thermal expansion coefficient of the electrode member and the thermal expansion coefficient of the glass tube is large, then the thickness of the copper thin film is made larger, and when such difference is small, then the thickness of the copper thin film is made smaller.

The coating of the copper thin film to the electrode member according to the present invention is performed, depending on a thickness required for the copper thin film, by methods of, (1) forming directly on a surface of the electrode member using a thin film forming technique such as a high-frequency wave sputtering, a vacuum deposition and the like, or (2) cladding including the steps of mechanically rolling at a high temperature while fitting the copper thin film on a surface of a plate member of alloy containing iron and nickel that is the electrode member. In case where the copper thin film is provided on the plate member by cladding, the plate member is punched into a disk shape and then drawing is performed so that a portion in contact with the glass tube becomes a copper thin film.

In case where the sealing electrode is used for the surge absorber, the punched circular plate is shaped into a hat shape by drawing. In case of the method (1) described above, the copper thin film is formed after the electrode member is formed into a hat shape. In case of (2) described above, a copper thin film is fitted on the electrode member to form a laminate, and thereafter the laminate is shaped into a hat shape. The copper thin film is formed not only on a portion in contact with the glass tube but also on a portion facing an inside of the glass tube. The surface of the copper thin film is formed thereon with a $Cu_2O$ film having a small work function for upgrading a wettability to glass and for accelerating electron emission. The $Cu_2O$ film can easily be formed by oxidizing the copper thin film. When the copper thin film is provided on one-side surface of the electrode member, the copper thin film is provided on a surface of the electrode member requiring the $Cu_2O$ film; namely, at least on a member surface in contact with the glass tube, and a member surface facing on the inside of the glass tube.

For a ratio of a thickness of the copper thin film to a sum thickness of the iron-nickel alloy and the copper thin film, 30 to 45% is preferable in case where the copper thin film is coated using a thin film forming technique such as plating and the like in (1) described above, while 40 to 80% is preferable in case where the plate member is coated with the copper thin film by cladding in (2) described above. If the ratio is less than a lower limit described, it comes extremely smaller than the thermal expansion coefficient of glass, and on the other hand if exceeding an upper limit described, it comes extremely larger than the thermal expansion coefficient of glass, and any of those are not preferable.

A nickel content in the iron-nickel alloy may preferably be 35 to 55%. In particular, in case where the copper thin film is formed by copper plating, the iron-nickel alloy formed of iron 58% and nickel 42% may be preferable.

In the sealing electrode having such a construction, by an arrangement that copper having a larger thermal expansion coefficient than the alloy containing iron and nickel is allowed to have a predetermined thickness and to lie between such alloy and glass, a thermal expansion coefficient of the alloy containing iron and nickel approximates to the thermal expansion coefficient of glass, and occurrence of cracks due to thermal contraction of the glass tube is eliminated at the time of sealing.

In addition, two layers, namely, the copper thin film and the $Cu_2O$ film are formed on the surface of the sealing electrode. For this reasons, first, a satisfactory wettability to glass at the time of sealing is obtained to provide the sealing even at a relatively lower temperature and in an inert gas atmosphere as is the case of Dumet wire, this hardly produce deterioration of both a conductive coating and the micro-gap due to a thermal stress. Secondly, due to a small work function of the $Cu_2O$, the arc discharge is easily transferred to between the sealing electrodes apart from a conductive coating of the surge absorbing element by its electron emission accelerating action, therefore a thermal damage of the conductive coating due to discharge is eliminated.

Furthermore, when the copper thin film is formed on an outer surface of the electrode member for connecting the lead wire to an outer surface of the sealing electrode, then an oxide film ($Cu_2O$ film) on the copper thin film formed by sealing is easily removed through washing an outer surface of the sealing electrode using hydrochloric acid after sealing, thereby the lead wire can readily be soldered.

BRIEF DESCRIPTION OF THE DRAWINGS

FIG. 1 is a sectional view of essentials of a surge absorber wherein a copper thin film of a sealing electrode of an embodiment of the present invention is formed on both surfaces of an electrode member by copper plating.

FIG. 4 is a sectional view of essentials of a surge absorber wherein a copper thin film of a sealing electrode of an embodiment of the present invention is formed on both surfaces of an electrode member by cladding.

FIG. 6 is a sectional view of essentials of a surge absorber wherein a copper thin film of a sealing electrode of an embodiment of the present invention is formed on one-side surface of an electrode member by copper plating.

FIG. 9 is a sectional view of essentials of a surge absorber wherein a copper thin film of a sealing electrode of an embodiment of the present invention is formed on one-side surface of an electrode member by cladding.

FIG. 10 is an external perspective view thereof.

BEST MODE FOR CARRYING OUT THE INVENTION

Embodiments of the present invention are described in detail with reference to the drawings together with the comparison examples.

Embodiment 1

Figure 2:
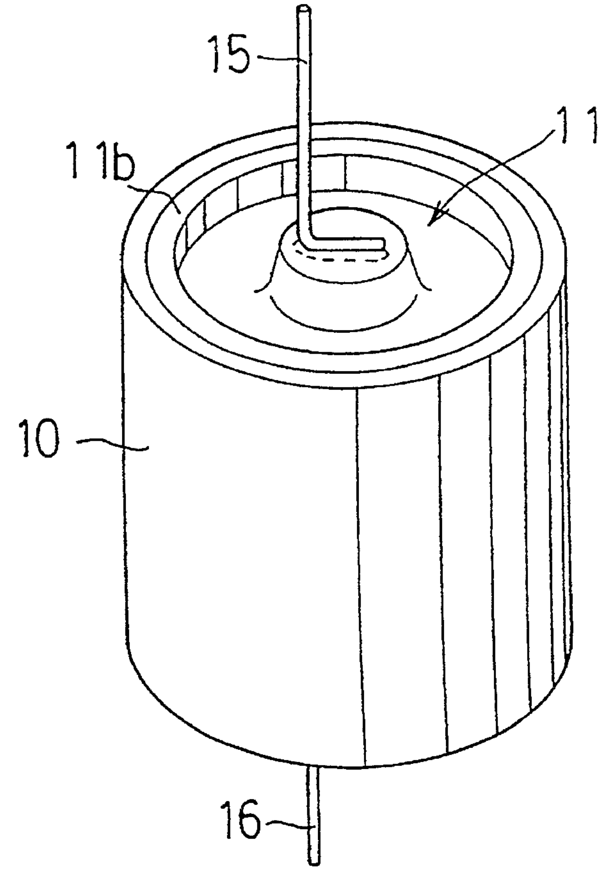
FIG. 2 is an external perspective view thereof.

As shown in FIGS. 1 and 2, both ends of a glass tube 10 of a pillar shape are sealed with sealing electrodes 11 and 12. FIG. 1 indicates in detail the sealing electrode 11 on an upper end. In this example, the glass tube 10 is made of lead glass being a kind of soft glass. The sealing electrode 11 is constructed of an electrode member **11*a* made of alloy of iron 58% and nickel 42%, a copper thin film 11*b* having a predetermined thickness formed to coat the electrode member 11*a*, and a $Cu_2O$ film 11*c* formed on a surface of the copper thin film 11*b*. The electrode member 11*a* is formed in a hat shape so as to be inserted into the glass tube 10, thereafter the entire electrode member 11*a* is copper plated to form the copper thin film 11*b* on the member surface at a predetermined thickness. Next, the electrode member 11*a* having the copper thin film 11*b* thereon is placed under an atmosphere of oxygen at a high temperature, and then suddenly cooled to form the $Cu_2O$ film 11*c* on the surface of the copper thin film 11*b***.

A micro-gap type surge absorbing element 13 is incorporated in the glass tube 10. This surge absorbing element 13 is made in that a micro-gap **13*c* of several tens μm is formed, by laser, on a periphery surface of a ceramics member 13*b* of a pillar shape coated with a conductive coating 13*a* and thereafter a cap electrode 13*d*** is pressed into both ends of the ceramics member.

A surge absorber 20 is made by a method as undermentioned. First, the surge absorbing element 13 is put into the glass tube 10, the sealing electrode 11 is attached on one-end of the glass tube 10. A recess portion 11*d* of the sealing electrode 11 is allowed to fit to the cap electrode 13*d* of the surge absorbing element 13. Next, the sealing electrode 12 having the same construction as the sealing electrode 11 is attached in a same way on the other-end of the glass tube 10. In this manner, a pair of cap electrodes 13*d* of the surge absorbing element 13 are electrically connected to the sealing electrodes 11 and 12. Then, this assembly is put into a sealing chamber (not shown) provided with a carbon heater, and air inside the glass tube is extracted by applying a negative pressure to the sealing chamber, and thereafter alternatively the inert gas, for example, argon gas is supplied into the sealing chamber to introducing the argon gas into the glass tube. In this situation, the glass tube 10 and the sealing electrodes 11 and 12 are heated by the carbon heater. A periphery edge of the electrode member 11*a* with the copper thin film is familiarized to the glass tube 10 through the $Cu_2O$ film, and the glass tube 10 is sealed with the sealing electrode 11. Thus, the surge absorber 20 sealed therein with argon gas 14 is made up. A presence of the $Cu_2O$ film provides sealing of the sealing electrodes 11 and 12 at as low as temperature of about 700° C.

Leads 15 and 16 are soldered on each outer surface of the sealing electrodes 11 and 12 which seal at both ends of the glass tube 10. To upgrade a solderability the outer surface of the sealing electrode is washed by hydrochloric acid to remove the oxide film ($Cu_2O$ film) on the copper thin film formed on the outer surface of the sealing electrode at the time of sealing. This oxide film is easily removed, the lead wires 15 and 16 are easily soldered.

In order to check an extent of adjustment for a thermal expansion coefficient of both the electrode member 11*a* and the glass tube 10 by the copper thin film 11*b*, occurrence of cracks in the glass tube 10 after sealing has visually been confirmed by varying a thickness (A) of the electrode member 11*a* (iron-nickel alloy) and a thickness (B, C) of the copper thin film 11*b*. Concretely, the thickness (B, C) of the copper thin films and the thickness (A) of iron-nickel alloy have been varied so as to obtain 20%, 30%, 45%, 50%, and 60% for a ratio (P) of a thickness (B+C) of the copper thin film to a thickness (A+B+C) of the entire sealing electrode.

Figure 3:
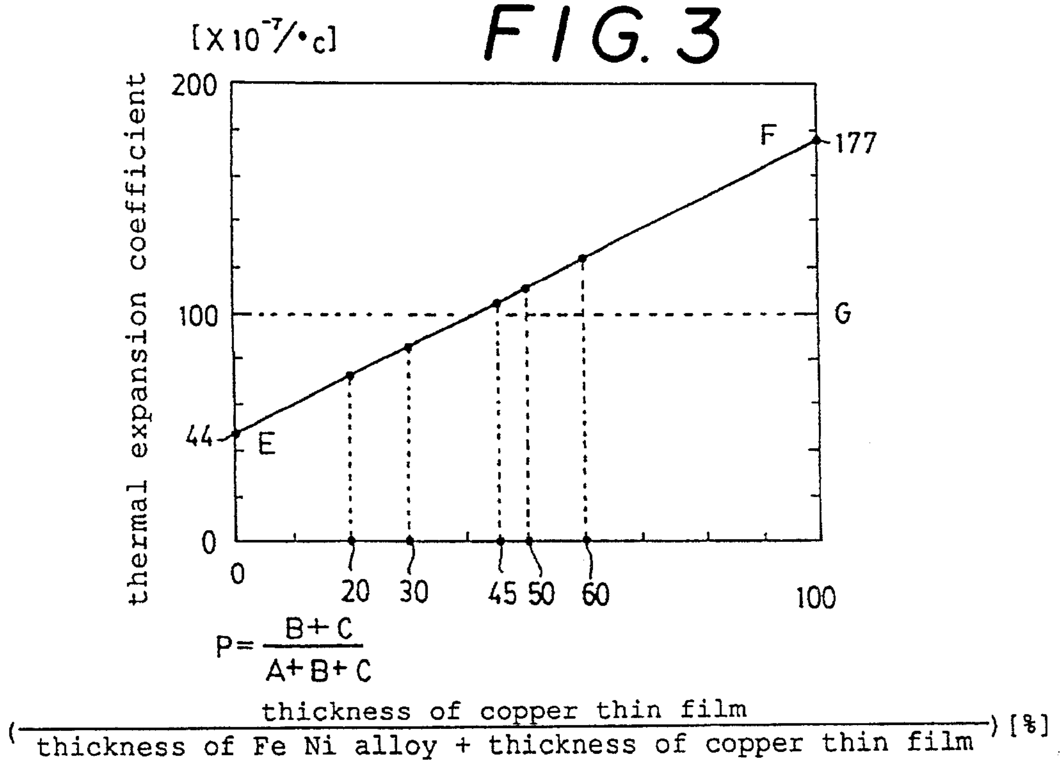
FIG. 3 is a view showing variation of a thermal expansion coefficient of a sealing electrode when changing a ratio of a thickness of a copper thin film to a sum of a thickness of an electrode member and the thickness of the copper thin film.

A result thereof is shown in Table 1 and FIG. 3. In FIG. 3, the vertical axis designates a thermal expansion coefficient, and the horizontal axis designates a ratio (P). A symbol E on the vertical axis represents a thermal expansion coefficient of alloy of iron 58% and nickel 42%, symbol F a thermal expansion coefficient of copper, and symbol G a thermal coefficient of lead glass. As a result of those, it was found that 30 to 45% the thickness of the entire sealing electrode is suitable for a thickness of the copper thin film 11*b*.

TABLE 1

| | | | | | |
|---|---|---|---|---|---|
| Thickness of Copper Thin Film (B + C) [μm] | 40 | 60 | 90 | 100 | 120 |
| Thickness of Fe—Ni Alloy (A) [μm] | 160 | 140 | 110 | 100 | 80 |
| P = (B + C)/(A + B + C) [%] | 20 | 30 | 45 | 50 | 60 |
| Crack Occurrence | Yes | No | No | Yes | Yes |

Comparison Example 1

Alloy of nickel 42%—Chromium 6%—iron 52% is used for an electrode member, which is formed thereon with $Cr_2O_3$ film to be made a sealing electrode. This sealing electrode and the same glass tube and surge absorbing element as in the embodiment are used and made up to a surge absorber containing argon gas. A temperature for sealing at this time is equal to or more than 900° C.

Each surge resistance and a service life are measured for the surge absorber of this comparison example 1 and the surge absorber of the embodiment 1 having a ratio (P) 45% described above. A result thereof is shown in Table 2. The surge resistance is measured using a surge current of (8×20) μ seconds regulated in JEC-212 (Institute of Electrical Engineers of Japan: Standard of the Japanese Electrotechnical Committee). For the service life, the number of times of deterioration start of a surge absorbing performance by repeatedly applying a surge voltage of 10 kV with a (1.2×50) μ seconds regulated in IEC-Pub. 60-2. It was found from Table 2 that the surge absorber of the embodiment 1 has a lower sealing temperature by 200° C. or more, a larger surge resistance, and a longer service life respectively compared to the surge absorber of the comparison example 1.

TABLE 2

| | Embodiment 1 | Comparison Example 1 |
|---|---|---|
| Electrode Member | Fe 58%—Ni 42% Alloy | Ni 42%—Cr 6%—Fe 52% Alloy |
| Sealing Temperature | 700° C. | 900° C. or more |
| Surge Resistance | 5000 A | 3000 A |
| Service Life | No Deterioration Occurs until 3000 Times. | Deterioration Occurs at 3000 Times. |

Embodiment 2

Figure 5:
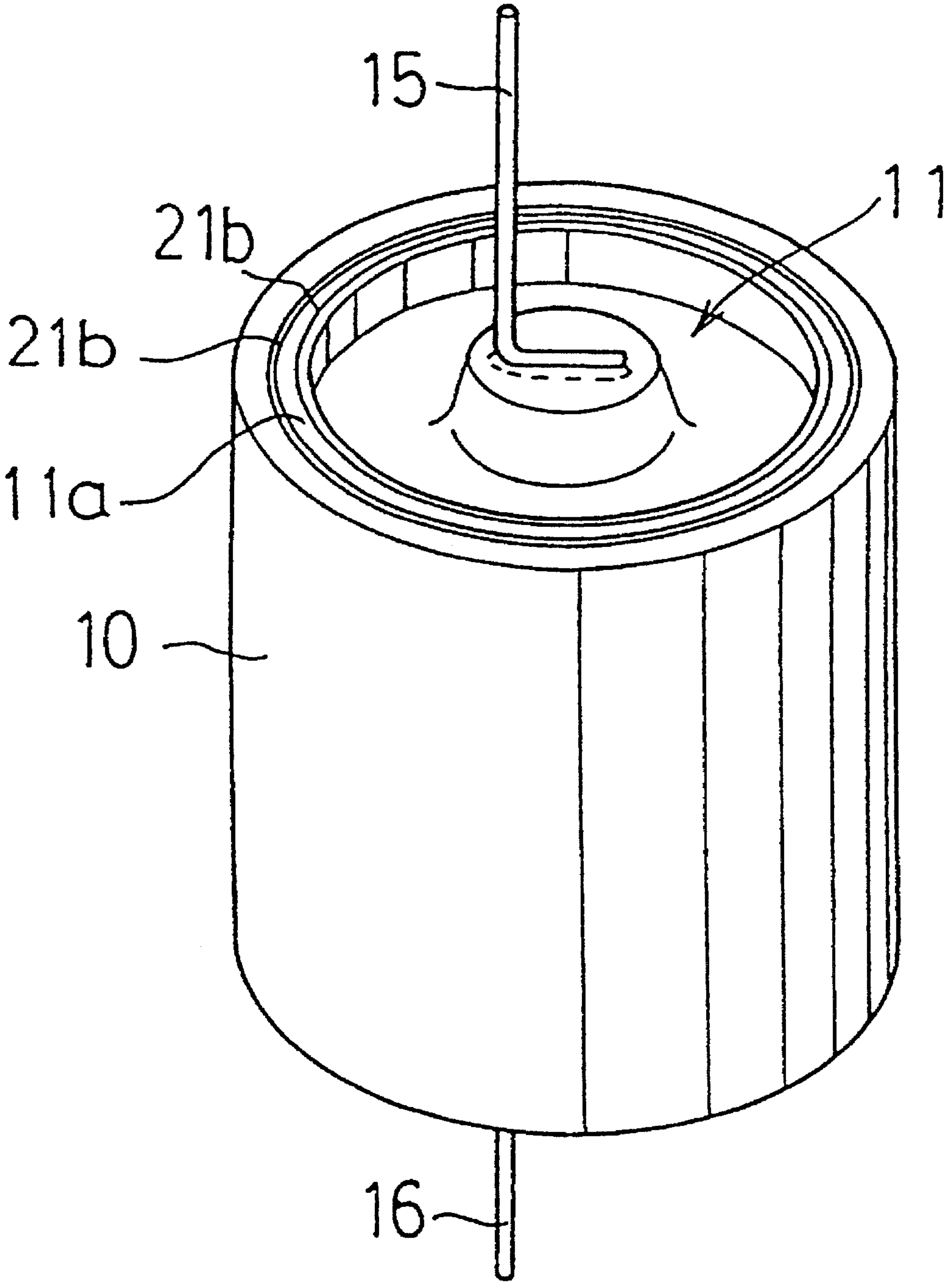
FIG. 5 is an external perspective view thereof.

As shown in FIGS. 4 and 5, an electrode member 11*a* of sealing electrodes 11 and 12 of this example is the same as the embodiment 1, a copper thin film 21*b* thereof is formed on both surfaces of the electrode member 11*a* by cladding. That is, first, the copper thin film is pressed mechanically on the both surfaces of plate member of iron—nickel alloy. Then, such plate member is punched in a circular shape having a predetermined diameter, thereafter the circular plate is shaped into a hat shape by drawing. Next, a molded body of a hat shape is placed under an oxygen atmosphere at a high temperature, and then suddenly cooled to form a $Cu_2O$ film 21*c* on a surface of the copper thin film 21*b*.

A micro-gap type surge absorbing element 13 is incorporated in a glass tube 10. The surge absorbing element 13 is made up in that a micro-gap 13*c* is formed on a periphery surface of a ceramics member 13*b* of a pillar shape having a diameter of 1.7 mm with a length of 5.5 mm which is coated by a conductive coating 13*a* in same manner of the embodiment 1 and thereafter a gap electrode 13*d* having a thickness of 0.2 mm is pressed into both ends of the ceramics member.

Thus, a surge absorber 20 is formed in the same way as in the embodiment 1, leads 15 and 16 are soldered on each outer surface of the sealing electrodes 11 and 12 in same manner of the embodiment 1.

In order to check an extent of adjustment for a thermal expansion coefficient of both the electrode member 11*a* and the glass tube 10 by the copper thin film 21*b*, a thermal expansion coefficient at 0° to 400° C. for the clad member is measured by varying a ratio of a thickness (A) of the electrode member 11*a* (iron-nickel alloy) and a thickness (B, C) of the copper thin films 21*b*. Concretely, the thickness (B, C) of the copper thin films and the thickness (A) of the iron-nickel alloy have been varied so as to obtain 0%, 30%, 40%, 50%, 60%, 70%, 80%, 90%, and 100% for a ratio (P) of a thickness (B+C) of the copper thin film for a thickness (A+B+C) of the entire sealing electrode.

A result thereof is shown in Table 3. From the result in Table 3, it has been found that 40 to 80% the thickness of the entire clad member is suitable for a thickness of the copper thin film 21*b* for an entire thickness of the clad member used for the sealing electrode. In addition, because this sealing electrode is constructed by fitting and rolling the copper thin film on the both surfaces of the clad member, then a discrimination of an upper surface and a lower surface is not required, thereby a higher efficiency is realized in manufacturing.

TABLE 3

| Ratio of Thickness of Copper Thin Film (%) $P = [(B + C)/(A + B + C)] \times 100$ | Thermal Expansion Coefficient [$\times 10^{-7}$/°C.] |
|---|---|
| 0 | 59.5 |
| 30 | 74.8 |
| 40 | 78.0 |
| 50 | 88.0 |
| 60 | 94.5 |
| 70 | 106.4 |
| 80 | 122.4 |
| 90 | 145.2 |
| 100 | 180.2 |
| Glass | 95.8 |

Comparison Example 2

Alloy of nickel 42%—Chromium 6%—iron 52% is used for an electrode member, which is formed thereon with $Cr_2O_3$ to be made a sealing electrode. This sealing electrode and the same glass tube and surge absorbing element as in the embodiment 2 are used and made up to a surge absorber containing argon gas. A temperature for sealing at this time is equal to 810° C.

Each surge resistance is measured for the surge absorber of this comparison example 2 and the surge absorber of the embodiment 2 having a ratio (P) 60% described above. Further, the sealing electrodes of every 100 pieces for the comparison example 2 and the embodiment 2 are sealed into the same glass tube, and a sealability is investigated. A result thereof is shown in Table 4. The surge resistance is measured using a surge current of (8×20) μ seconds regulated in JEC-212 (Institute of Electrical Engineers of Japan: Standard of the Japanese Electrotechnical Committee). It is found from Table 4 that the surge absorber in the embodiment 2 has a lower sealing temperature by 100° C. or more and a larger surge resistance respectively compared to the surge absorber of the comparison example 2. A sealability in the embodiment 2 is considerably superior compared to the comparison example 2.

TABLE 4

| | Embodiment 2 | Comparison Example 2 |
|---|---|---|
| Electrode Member | Fe 58%—Ni 42% Alloy | Ni 42%—Cr 6%—Fe 52% Alloy |
| Sealing Temperature | 700° C. | 810° C. |
| Sealability | 100% | 60% |
| Discharge Start Voltage | 300 V | 300 V |
| Impulse Response Voltage | 500 V | 500 V |
| Surge Resistance | 7 kA | 5 kA |

TABLE 4-continued

Embodiment 3

Figure 7:
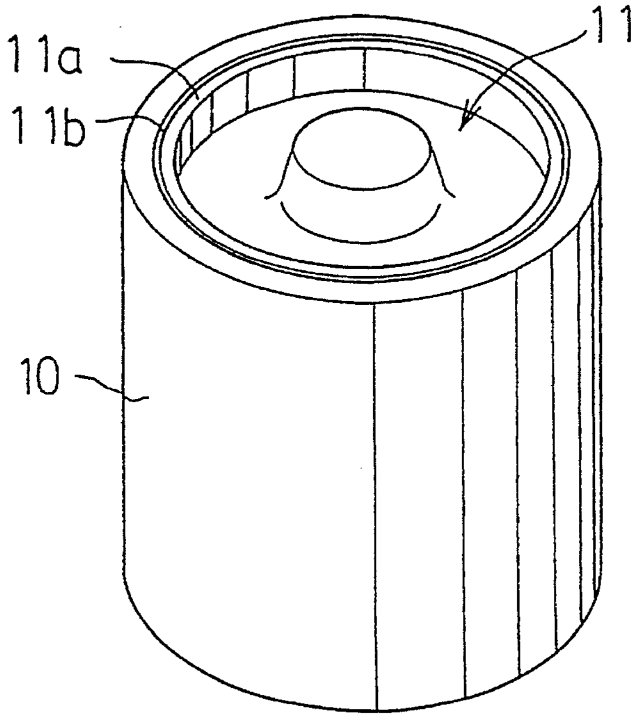
FIG. 7 is an external perspective view thereof.

As shown in FIGS. 6 and 7, an electrode member 11*a* of sealing electrodes 11 and 12 of this example is the same as in the embodiment 1, and a copper thin film 11*b* thereof is formed on one-side surface of the electrode member 11*a* by copper plating. That is, the electrode member 11*a* is formed into a hat shape so as to be inserted into a glass tube 10, and then the copper thin film 11*b* is formed at a predetermined thickness on a member surface of a contact portion with the glass tube 10 and on a member surface facing with an inside of the glass tube 10 by a copper plating method. Next, the electrode member 11*a* formed with the copper thin film 11*b* is placed under an oxygen atmosphere at a high temperature, thereafter suddenly cooled to form a $Cu_2O$ film 11*c* on a surface of the copper thin film 11*b*.

A micro-gap type surge absorbing element 13 the same as in the embodiment 1 is incorporated in the glass tube 10 in a same manner as in the embodiment 1.

A surge absorber 20 is made up in the same way as in the embodiment 1 as undermentioned.

In order to check an extent of adjustment for a thermal expansion coefficient of both the electrode member 11*a* and the glass tube 10 by the copper thin film 11*b*, occurrence of cracks in the glass tube 10 after sealing was visually confirmed by varying a thickness (A) of the electrode member 11*a* (iron-nickel alloy) and a thickness (B) of the copper thin film 11*b*. Concretely, the thickness (B) of the copper thin film and the thickness (A) of the iron-nickel alloy were varied so as to obtain 20%, 30%, 45%, 50%, and 60% for a ratio (P) of the thickness (B) of the copper thin film to a thickness (A+B) of the entire sealing electrode.

Figure 8:
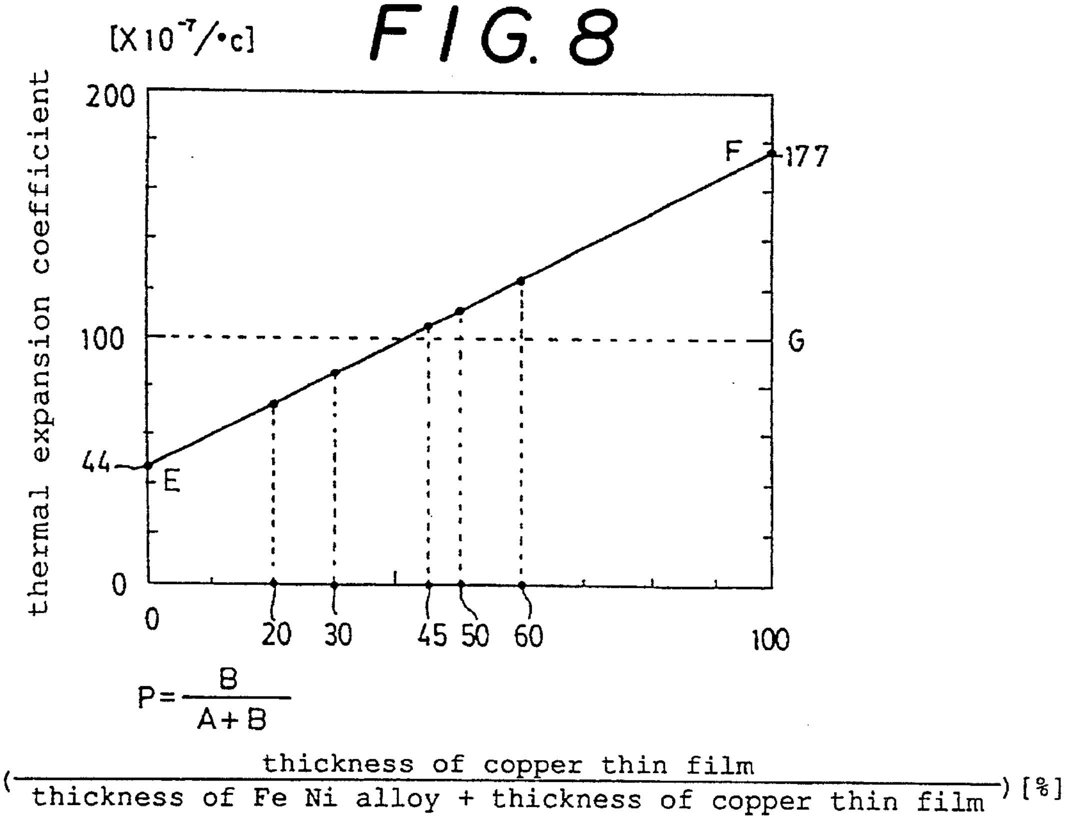
FIG. 8 is a view showing variation of a thermal expansion coefficient of a sealing electrode when changing a ratio of a thickness of a copper thin film to a sum of a thickness of an electrode member and the thickness of the copper thin film.

A result thereof is shown in Table 5 and FIG. 8. In FIG. 8, a vertical axis designates a thermal expansion coefficient, and a horizontal axis designates a ratio (P). Symbol E on the vertical axis represents a thermal expansion coefficient of alloy of iron 58% and nickel 42%, symbol F a thermal expansion coefficient of copper, and symbol G a thermal coefficient of lead glass. As a result of those, it is found that 30 to 45% the thickness of the entire sealing electrode is suitable for a thickness of the copper thin film 11*b*.

TABLE 5

| | | | | | |
|---|---|---|---|---|---|
| Thickness of Copper Thin Film (B) [μm] | 40 | 60 | 90 | 100 | 120 |
| Thickness of Fe—Ni Alloy (A) [μm] | 160 | 140 | 110 | 100 | 80 |
| P = B/(A + B) [%] | 20 | 30 | 45 | 50 | 60 |
| Crack Occurrence | Yes | No | No | Yes | Yes |

Comparison Example 3

Alloy of nickel 42%—Chromium 6%—iron 52% is used for an electrode member, which is formed thereon with $Cr_2O_3$ to be made a sealing electrode. This sealing electrode and the same glass tube and surge absorbing element as in the embodiment 3 are used and made up to a surge absorber containing argon gas. A temperature for sealing at this time is equal to or more than 900° C.

Each surge resistance and service life are measured for the surge absorber of this comparison example 3 and the surge absorber of the embodiment 3 having a ratio (P) 45% described above. A result thereof is shown in Table 6. The surge resistance is measured using a surge current of (8×20) μ seconds regulated in JEC-212 (Institute of Electrical Engineers of Japan: Standard of the Japanese Electrotechnical Committee). For the service life, the number of times of deterioration start of a surge absorbing performance is measured by repeatedly applying a surge voltage of 10 kV with a (1.2×50) μ seconds regulated in IEC-Pub. 60-2. It is found from Table 6 that the surge absorber in the embodiment 3 has a lower sealing temperature by 200° C. or more, a larger surge resistance, and a longer service life respectively compared to the surge absorber of the comparison example 3.

TABLE 6

| | Embodiment 3 | Comparison Example 3 |
|---|---|---|
| Electrodes Member | Fe 58%—Ni 42% Alloy | Ni 42%—Cr 6%—Fe 52% Alloy |
| Sealing Temperature | 700° C. | 900° C. or more |
| Surge Resistance | 5000 A | 3000 A |
| Service Life | No Deterioration Occurs until 3000 Times. | Deterioration Occurs at 3000 Times. |

Embodiment 4

As shown in FIGS. 9 and 10, an electrode member 11*a* of sealing electrodes 11 and 12 of this example is the same as in the embodiment 1, and a copper thin film 21*b* thereof is formed, by the same method of cladding as in the embodiment 2, but only on one-side surface of the electrode member 11*a* different from the embodiment 2. A surge absorber is made up in the same way as in the embodiment 1 as undermentioned.

In order to check an extent of adjustment for a thermal expansion coefficient of both the electrode member 11*a* and the glass tube 10 by the copper thin film 21*b*, a thermal expansion coefficient of a clad member at 0° to 400° C. formed of the iron—nickel alloy and the copper thin film is measured by varying a ratio of a thickness (A) of the electrode member 11*a* (iron-nickel alloy) and a thickness (B) of the copper thin film 11*b*. Concretely, the thickness (B) of the copper thin film and the thickness (A) of the iron—nickel alloy are varied so that a ratio (P) of the thickness (B) of the copper thin films to the thickness (A+B) of the entire sealing electrode becomes 0%, 30%, 40%, 50% 60%, 70%, 80%, 90%, 100%.

A result thereof is shown in Table 7. As a result of Table 7, it is found that 40 to 80% the thickness of the entire sealing electrode is suitable for a thickness of the copper thin film 21*b* for an entire thickness of the clad member used for the sealing electrode.

TABLE 7

| Ratio of Thickness of Copper Thin Film (%) P = [B/(A + B)] × 100 | Thermal Expansion Coefficient [× $10^{-7}$/°C.] |
|---|---|
| 0 | 59.5 |
| 30 | 74.8 |
| 40 | 78.0 |
| 50 | 88.0 |
| 60 | 94.5 |
| 70 | 106.4 |
| 80 | 122.4 |
| 90 | 145.2 |
| 100 | 180.2 |
| Glass | 95.8 |

(Comparison Example 4)

Alloy of nickel 42%—Chromium 6%—iron 52% is used for an electrode member, which is formed thereon with $Cr_2O_3$ to be made a sealing electrode. This sealing electrode and the same glass tube and surge absorbing element as in the embodiment 4 are used and made up to a surge absorber containing argon gas. A temperature for sealing at this time is equal to 810° C.

Measurement is made for the surge absorber of this comparison example 4 and the surge absorber of the embodiment 4 having a ratio (P) 60% as described above, regarding a discharge start voltage, an impulse response voltage, and a surge resistance. Further, the sealing electrodes of every 100 pieces for the comparison example 4 and the embodiment 4 are sealed to the glass tube, and a sealability is investigated. A result thereof is shown in Table 8. The surge resistance is measured using a surge current of (8×20) μ seconds regulated in JEC-212 (Institute of Electrical Engineers of Japan: Standard of the Japanese Electrotechnical Committee). It is found from Table 8 that the surge absorber in the embodiment 4 has a lower sealing temperature by 100° C. or more and a larger surge resistance respectively compared to the surge absorber of the comparison example 4. A sealability in the embodiment 4 is considerably superior compared to the comparison example 4.

TABLE 8

| | Embodiment 4 | Comparison Example 4 |
|---|---|---|
| Electrode | Fe 58%—Ni 42% Alloy | Ni 42%—Cr 6%—Fe 52% Alloy |
| Sealing Temperature | 700° C. | 810° C. |
| Sealability | 100% | 60% |
| Discharge Start Voltage | 300 V | 300 V |
| Impulse Response Voltage | 500 V | 500 V |
| Surge Resistance | 7 kA | 5 kA |

Compared the embodiments 1 to 4 with the comparison examples 1 to 4, the surge absorber according to the present invention is characterized as undermentioned.

(1) Occurrence of cracks of the glass tube at the time of adhering is prevented by varying a ratio of thicknesses of the copper thin films if a thermal expansion coefficient of the sealing electrode formed by combining the electrode member and the copper thin film is allowed to approximate a thermal expansion coefficient of glass.

(2) Conventionally, the iron-nickel alloy, which has a too thick oxide film, requires the gas burner flame and can not provide sealing in an inert gas atmosphere. However, according to the invention, the sealing is achieved by a carbon heater even within the inert gas atmosphere because of presence of the $Cu_2O$ film on the copper thin film even in case of the iron-nickel alloy.

(3) The surge absorber according to the present invention has a considerably upgraded wettability between the sealing electrode and the glass due to presence of the $Cu_2O$ film on the copper thin film, thus the sealing electrode can be sealed at a lower temperature by an extent of 100° to 200° C. than the sealing electrode of the conventional surge absorber. Thereby, in the surge absorber of present invention, a variation due to softening of glass becomes very smaller to further relax a thermal stress of the conductive coating of the micro-gap type surge absorbing element inside the glass tube. In addition, the sealing is available for a discharge tube type of surge absorbers having a larger diameter.

(4) The $Cu_2O$ film on an inside-surface of the sealing electrode according to the present invention exhibits an electron emission accelerating action, hence at the time of applying the surge voltage, an arc discharge started at vicinity of the micro-gap comes to easily arise between the sealing electrodes apart from both the micro-gap and the conductive coating.

For the reasons of (3) and (4), thermal damage of the conductive coating is eliminated, the surge resistance of the surge absorber is made larger, and the service life is extended.

(5) In case where the copper thin film is formed on the both surfaces of the electrode member as in the embodiments 1 and 2 and the lead wire is connected to the outer surface of the sealing electrode after sealing, then the oxide film ($Cu_2O$ film) on the copper thin film formed by sealing is easily removed by washing the outer surface of the sealing electrode using hydrochloric and hence the lead wire can readily be soldered.

INDUSTRIAL APPLICABILITY

The sealing electrode according to the present invention is utilized as a sealing electrode for sealing inert gas into a glass tube, and in particular is useful for the sealing electrode which is sealed at both ends of the glass tube incorporating a micro-gap type surge absorbing element.

We claim:

1. A sealing electrode sealed in a glass tube comprising:

an electrode member formed of an alloy containing iron and nickel, a copper thin film formed on both surfaces of the electrode member to coat the electrode member, and a $Cu_2O$ film formed on a surface of the copper thin film facing an inside surface of the glass tube.

2. The sealing electrode as defined in claim 1, wherein the copper thin film (21*b*) is fitted and rolled on both surfaces of the electrode member (11*a*).

3. The sealing electrode as defined in claim 2, wherein the electrode member (11*a*) is made of iron-nickel alloy, the copper thin film (21*b*) is fitted and rolled by cladding, and 40 to 80% is given for a ratio of a thickness of the copper thin film to a sum value of a thickness of the electrode member (11*a*) and a thickness of the copper thin film (21*b*)

4. The sealing electrode as defined in claim 3, wherein a nickel content in the iron-nickel alloy is 35 to 55 weight %.

5. The sealing electrode as defined in claim 3, wherein the $Cu_2O$ film (21*c*) is formed on a surface of the copper thin film (21*b*).

6. The sealing electrode as defined in claim 5, wherein the $Cu_2O$ film (21*c*) is formed by oxidizing the copper thin film (21*b*).

7. A sealing electrode sealed in a glass tube (10), the sealing electrode comprising:

an electrode member (11*a*) made of alloy containing iron and nickel, a copper thin film (11*b*, 21*b*) provided both on a surface of the member (11*a*) of a contact portion with the glass tube (10) and on a surface of the member (11*a*) facing on an inside of the glass tube (10), and a $Cu_2O$ film (11*c*, 21*c*) formed on a surface of the copper thin film (11*b*, 21*b*).

8. The sealing electrode as defined in claim 7, wherein the $Cu_2O$ film (11*c*, 21*c*) is formed by oxidizing the copper thin film (11*b*, 21*b*).

9. The sealing electrode as defined in claim 7, wherein the electrode member (11*a*) is made of alloy of iron 58% and nickel 42%, the copper thin film (11*b*) is formed by copper plating, and 30 to 45% is given for a ratio of a thickness of the copper thin film to a sum value of a thickness of the electrode member (11*a*) and a thickness of the copper thin film (11*b*).

10. The sealing electrode as defined in claim 7, wherein the copper thin film (21*b*) is fitted and rolled respectively on a surface of the electrode member (11*a*) of a contact portion with the glass tube (10) and on a surface of the member (11*a*) facing on an inside of the glass tube (10).

11. The sealing electrode as defined in claim 7, wherein the electrode member (11*a*) is made of iron-nickel alloy, the copper thin film (21*b*) is fitted and rolled by cladding, and 40 to 80% is given for a ratio of a thickness of the copper thin film to a sum value of a thickness of the electrode member (11*a*) and a thickness of the copper thin film (21*b*).

12. The sealing electrode as defined in claim 11, wherein a nickel content in the iron-nickel alloy is 35 to 55 weight %.

13. The sealing electrode as defined in claim 1, wherein the electrode member (11*a*) is made of an alloy of iron 58% by weight and nickel 42% by weight, the copper thin film (11*b*) is formed by copper plating, and 30 to 45% is given for a ratio of a thickness of the copper thin film to a sum value of a thickness of the electrode member (11*a*) and a thickness of the copper thin film (11*b*).

14. A surge absorber comprising:

a glass tube;

a surge absorbing element incorporated in the glass tube and having a pair of cap electrodes on both ends of a ceramic member of a pillar shape coated by a conductive coating wherein a micro-gap is formed on a periphery surface of the ceramic member, a sealing electrode sealed in a glass tube comprising:

an electrode member formed of an alloy containing iron and nickel;

a copper thin film formed on both surfaces of the electrode member to coat the electrode member;

a $Cu_2O$ film formed on a surface of the copper thin film facing an inside surface of the glass tube electrically connected to the one pair of cap electrodes; and inert gas sealed into space formed by the sealing electrodes and the glass tube.

15. A surge absorber comprising:

a glass tube;

a surge absorbing element incorporated in the glass tube and having a pair of cap electrodes on both ends of a ceramic member of a pillar shape coated by a conductive coating wherein a micro-gap is formed on a periphery surface of the ceramic member;

a sealing electrode sealed in a glass tube, the surge absorbing element being fixed to the sealing electrodes by means of the cap electrodes, the sealing electrode comprising:

an electrode member made of an alloy containing iron and nickel;

a copper thin film provided both on a surface of the member of a contact portion with the glass tube and on a surface of the member facing on an inside of the glass tube;

a $Cu_2O$ film formed on a surface of the copper thin film electrically connected to the one pair of cap electrodes, the surge absorbing element being fixed to the sealing electrodes by means of the cap electrodes; and inert gas sealed into space formed by the sealing electrodes and the glass tube.

* * * * *